United States Patent [19]

Okura et al.

[11] Patent Number: 4,637,098
[45] Date of Patent: Jan. 20, 1987

[54] SHIM USED FOR CABLE CLAMP

[75] Inventors: Masahiko Okura; Minoru Inayashi, both of Tokyo, Japan

[73] Assignee: Okura Electric Industry Co., Ltd., Tokyo, Japan

[21] Appl. No.: 812,713

[22] Filed: Dec. 23, 1985

[51] Int. Cl.[4] .............................................. F16G 11/04
[52] U.S. Cl. ................................ 24/136 R; 24/136 L; 24/115 M; 403/211
[58] Field of Search ............ 24/136 R, 136 L, 115 M; 403/211, 212, 109, 16

[56] References Cited

U.S. PATENT DOCUMENTS

| | | | |
|---|---|---|---|
| 1,297,187 | 3/1919 | Lamb | 403/211 |
| 1,393,107 | 10/1921 | Fuller | 24/136 R |
| 1,545,889 | 7/1925 | Everson | 24/136 R |
| 1,622,109 | 3/1927 | Haworth | 403/211 |
| 1,644,376 | 10/1927 | Haworth | 403/211 |
| 1,653,840 | 12/1927 | Byl | 24/115 M |
| 1,656,226 | 1/1928 | Palm et al. | 24/136 R |
| 1,759,591 | 5/1930 | Pleister et al. | 24/115 M |
| 2,068,368 | 1/1937 | Bouvier et al. | 24/136 R |
| 2,472,527 | 6/1949 | Gordon et al. | 403/212 |
| 2,529,327 | 11/1950 | Carlson | 24/136 R |
| 2,781,212 | 2/1957 | Jugle | 24/115 M |
| 4,040,754 | 8/1977 | Burroughs | 24/136 R |
| 4,542,562 | 9/1985 | Okura | 24/136 R |

*Primary Examiner*—Victor N. Sakran
*Attorney, Agent, or Firm*—Moonray Kojima

[57] ABSTRACT

Disclosed herein is a shim having a quite simple and easily operable shape and is used for a cable clamp composed of a wedge-like member and a sleeve-like member, those members being telescopically assembled to clamp a cable therebetween. Said sleeve-like member is linked with said shim through a simple and low cost means.

1 Claim, 6 Drawing Figures

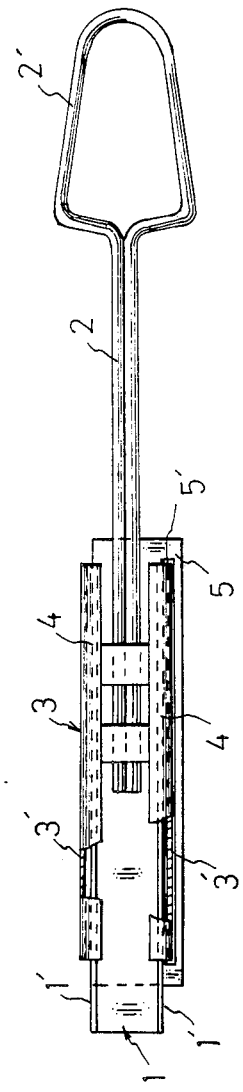
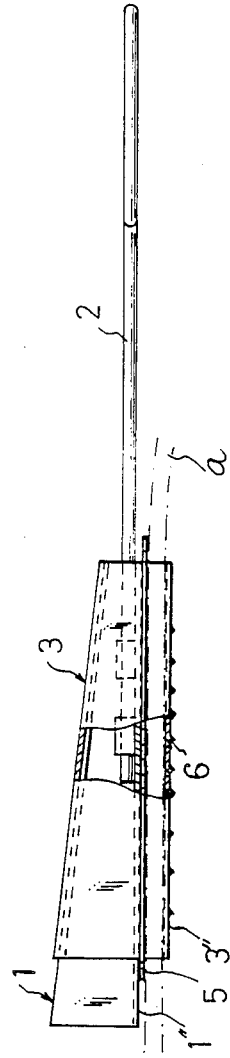

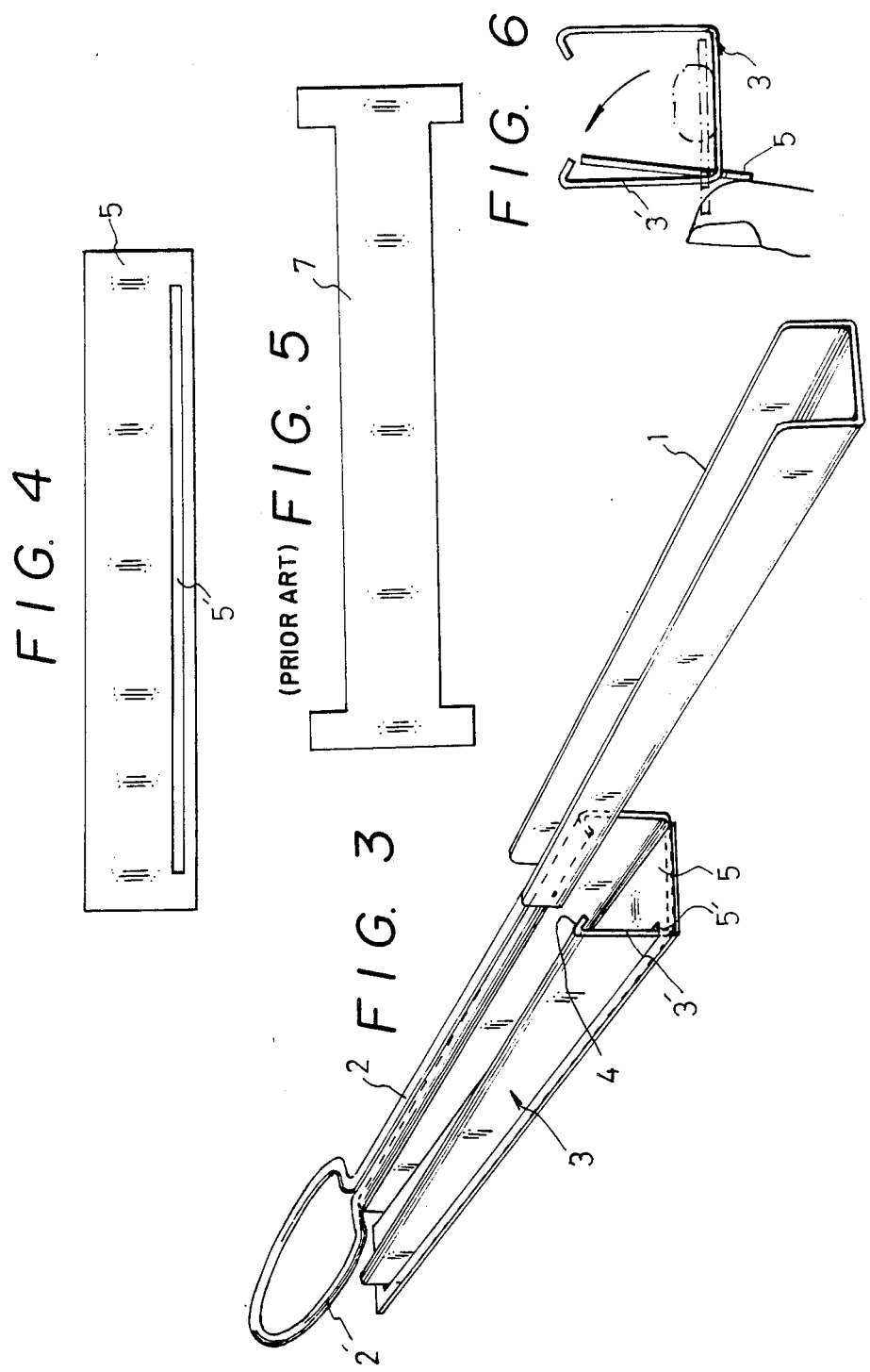

SHIM USED FOR CABLE CLAMP

BACKGROUND OF THE INVENTION

This invention relates to a shim of a novel shape used for a cable clamp composed of a wedge-like member and a sleeve-like member, those members being telescopically assembled to clamp a cable therebetween through a wedge action, or a longitudinal relative move thereof. In these sorts of clamps, while a shim plate is ordinarily located between the bottom plate of the wedge-like member and the cable prior to the wedge action to effect the action smoothly, it, heretofore, has been a part separated from other two members, therefor, the clamping worker has been caused to set properly the three separate parts in the course of clamping work which results in making the clamping work troublesome and complicated one. The conventional shim 7 is shown in FIG. 5.

SUMMARY OF THE INVENTION

The object of the invention is to provide a shim of an oblong plate to be linked with the sleeve-like member, which has a slit along one of the longitudinal edges thereof, the size of the slit being adopted rather larger than the contour of the cross section of the lower portion of one of the side plates of the sleeve-like member for permitting the shim to be in a slight loose fit to the side plate when the latter is fit into and linked with the former.

BRIEF DESCRIPTION OF THE DRAWING

FIG. 1 is a plan view of a preferred embodiment of a clamp provided with the shim of the invention, showing a clamping state;

FIG. 2 is an, fragmentary sectioned, elevation of the same;

FIG. 3 is an exploded perspective view in an enlarged scale;

FIG. 4 is a plan view of the shim of the invention;

FIG. 5 is a plan view of the conventional shim;

FIG. 6 is a schematic side view showing the pushing up action of the shim.

DESCRIPTION OF THE PREFERRED EMBODIMENT

In the Figures, 1 is an, substantially, upper opened channel bar type wedge-like member, both side plates 1', 1' of which are formed respectively into a wedge-like plate becoming narrower starting at the rear end thereof in towards the fore end of the same. 2 is a suspending ring member provided with a suspending ring 2' at the fore end portion thereof, the rear end portion of which is attached fixedly on the bottom plate 1" of the member 1 by means of, in this instance, inserting the rear end portion into apertures formed between the bottom plate 1" and cut-and-raise pieces of the plate 1". 3 is an, substantially, upper opened channel bar type sleeve-like member, both side plates 3', 3' of which are formed respectively into a wedge-like plate after the fashion of the plates 1', 1' and have respectively a slightly inturned upper edge 4. When in use, the member 1 may, as well known in FIGS. 1, 2, be assembled with member 3 in such a manner as held in the latter from below in the use of the inturned edges 4, 4, in longitudinally relatively movable and vertically spaced relation for clamping a cable a between the bottom plates of the two members. 5 is a shim of an oblong thin plate formed with a slit 5' along one side of the longitudinal eges thereof. This slit 5' has a rather larger size than the contour of the cross-section of the lower portion of the side plate 3' so that the shim may be in a loose fit to the plate 3' in a little spaced relation. To fit in the side plate 3' to the shim, it may be fitted in from above through the inturned edge 4. 6 is an anti-skid portion formed by partial cut-and-raise means of the bottom plate 3".

In operation, the shim 5 may be pushed up in the first place as shown in FIG. 6, then the cable a will be set on the sleeve-like member as shown in FIGS. 1 and 2, followed by setting the pushed-up shim of the cable. The wedge-like member 1 may be fitted into the member 3 from backward of the member 3 in the next place, at which time the upper surface of the shim will be adapted to contact with the bottom pate 1" of the member 1. Thus, the cable may be clamped between two members through the shim 5 following the forwardly pulling out action of the member 1. Inasmuch as the shim 5 is set between the bottom plate 1" and the cable, the pulling out action of the member 1 may be smoothly effected despite of uneven surface of the cable cover. For this purpose, the upper surface of the shim is formed into an even one and is ordinarily made of hard, waterproof and low sliding-resistance material.

Since the shim of this invention is linked with the side plate 3' of the sleeve-like member 3, the worker may only set the shim properly onto the cable following the pushing up action of the shim, therefor, there are no need of particular troublesome positioning of the shim, no inconvience of dropping it from the workers' hand in the course of the clamping work which, in turn, will permit the working efficiency to increase by that.

We claim:

1. In a cable clamp comprising
   an elongated transversely U-shaped tapered body member (3) having inturned flanges (4) along the marginal edges of the sides thereof to form guides;
   an elongated transversely U-shaped tapered wedge member (1) slidably positioned within said body member and having its marginal edges located in said guides;
   a suspending ring member (2) secured to said wedge member; and
   shim member (5) disposed within said body member, the improvement comprising
   said shim member comprising a substantially flat elongated plate having a slit (5') extending along one side thereof and of a dimension to fit around one side (3') of said body member (3), such that one part of said shim member is located on the outside of said side (3') of said body member, and the remaining part of said shim member is located inside of said body member, whereby (see FIG. 6) manual pushing of said one part of said shim member enables rotation of said shim member about a pivot point of said slit from a position whereat the shim member is flat against the bottom of said body member to another position whereat the shim member is against the side (3') of said body member.

* * * * *